(12) United States Patent
Herndon et al.

(10) Patent No.: US 9,143,617 B2
(45) Date of Patent: Sep. 22, 2015

(54) SYSTEM AND METHOD FOR PROVIDING A CALL FORWARD INDICATOR

(75) Inventors: Matthew Herndon, Shawnee, KS (US); Johnny Hawkins, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1459 days.

(21) Appl. No.: 12/275,006

(22) Filed: Nov. 20, 2008

(65) Prior Publication Data

US 2010/0124323 A1     May 20, 2010

(51) Int. Cl.
*H04M 3/42*     (2006.01)
*H04M 3/54*     (2006.01)

(52) U.S. Cl.
CPC ............ *H04M 3/54* (2013.01); *H04M 3/42042* (2013.01); *H04M 2201/38* (2013.01)

(58) Field of Classification Search
CPC .... H04M 1/575; H04M 3/42042; H04M 3/54
USPC .......................... 379/142.01, 142.04, 142.08, 379/211.01–211.04, 207.15–207.16
See application file for complete search history.

(56) References Cited

U.S. PATENT DOCUMENTS

| | | | |
|---|---|---|---|
| 6,738,466 B1 * | 5/2004 | LaPierre et al. | 379/211.02 |
| 7,239,690 B2 * | 7/2007 | Pearson et al. | 379/207.16 |
| 7,370,278 B2 | 5/2008 | Malik et al. | |
| 7,370,289 B1 | 5/2008 | Ebert et al. | |
| 7,797,379 B2 | 9/2010 | Hawkins | |
| 7,929,675 B2 * | 4/2011 | Ruckart | 379/142.06 |
| 8,156,182 B2 | 4/2012 | Hawkins | |
| 2005/0157859 A1 * | 7/2005 | Rodriguez et al. | 379/142.01 |
| 2007/0248221 A1 * | 10/2007 | Chatterjee et al. | 379/211.02 |
| 2008/0043968 A1 * | 2/2008 | Jain et al. | 379/211.02 |
| 2008/0101584 A1 | 5/2008 | Gray et al. | |
| 2008/0102783 A1 | 5/2008 | Bustamante et al. | |
| 2008/0107258 A1 | 5/2008 | Fitzsimmons et al. | |
| 2008/0295000 A1 | 11/2008 | Kiesselbach et al. | |
| 2009/0030989 A1 | 1/2009 | Maresch et al. | |
| 2009/0097629 A1 * | 4/2009 | Huslak et al. | 379/207.01 |
| 2009/0282094 A1 | 11/2009 | Hawkins | |
| 2010/0323675 A1 | 12/2010 | Hawkins | |

OTHER PUBLICATIONS

U.S. Appl. No. 12/850,749; Issue Notification dated Mar. 21, 2002; 2 pages.
U.S. Appl. No. 12/850,749; Notice of Allowance dated Dec. 12, 2011; 9 pages.
U.S. Appl. No. 12/850,749; Non-Final Rejection dated Jul. 20, 2011; 7 pages.
U.S. Appl. No. 12/116,044; Non-Final Rejection dated Dec. 7, 2009; 18 pages.

(Continued)

*Primary Examiner* — Nafiz E Hoque
(74) *Attorney, Agent, or Firm* — Swanson & Bratschun, L.L.C.

(57) ABSTRACT

Embodiments of the disclosed invention include a system and a method for providing a call forward indicator to enable a called party to identify a forwarded call. In one embodiment, the method includes receiving calling information for placing a telephone call. The method determines from the calling information whether the telephone call is a forwarded call. The method modifies a caller identification of a calling party associated with the telephone call to include a call forward indicator in response to determining that the telephone call is a forwarded call. The method transmits the caller identification having the call forward indicator to a forwarded communication device associated with the called party.

12 Claims, 3 Drawing Sheets

(56) References Cited

OTHER PUBLICATIONS

U.S. Appl. No. 12/116,044; Final Rejection dated Apr. 21, 2010; 16 pages.

U.S. Appl. No. 12/116,044; Notice of Allowance dated Jun. 25, 2010; 22 pages.

U.S. Appl. No. 12/116,044; Issue Notification dated Aug. 25, 2010; 1 page.

* cited by examiner

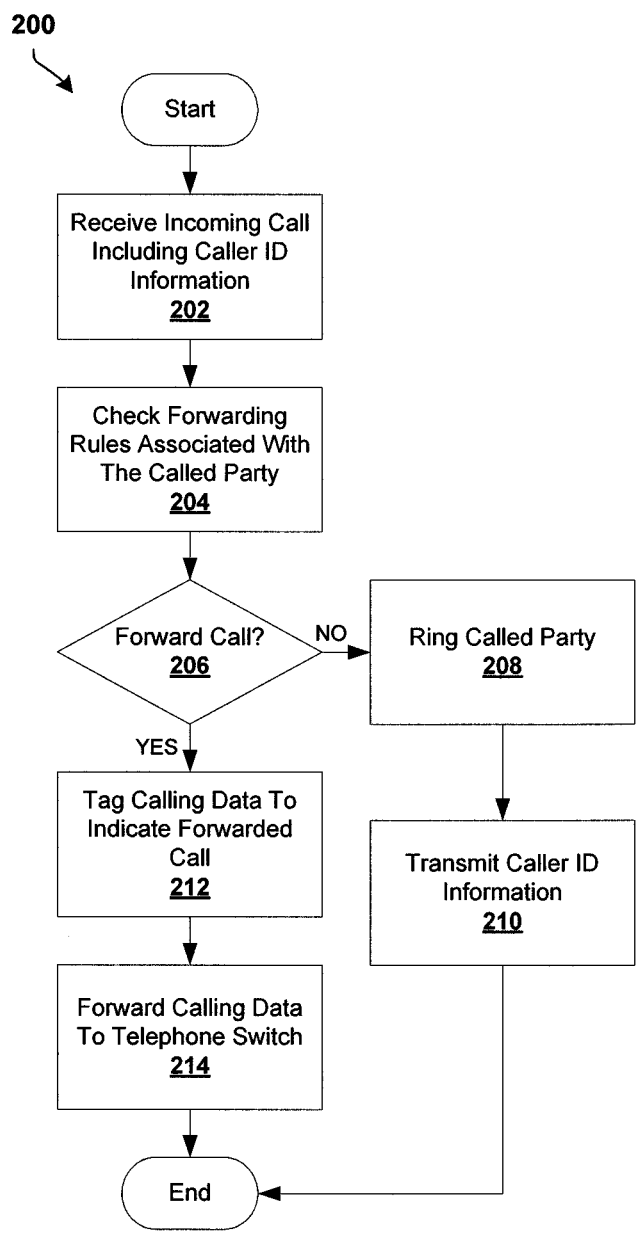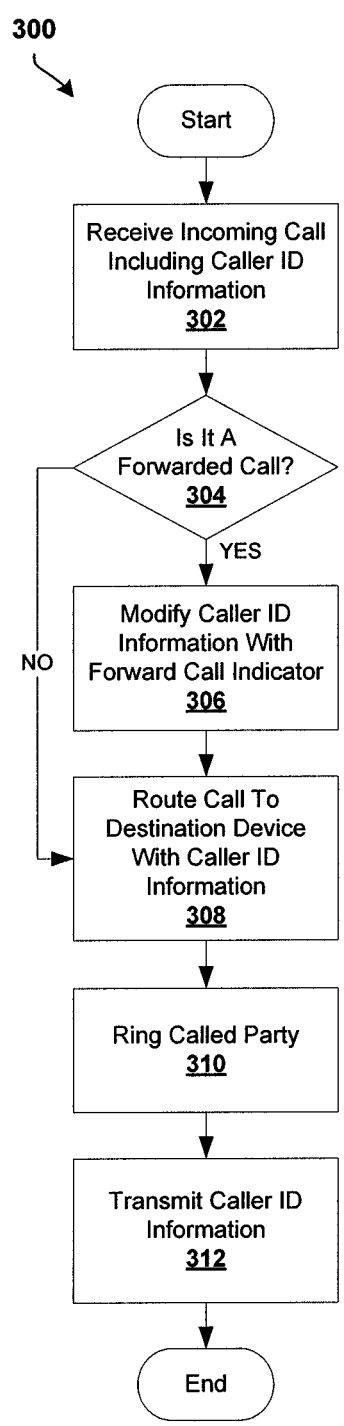

SYSTEM AND METHOD FOR PROVIDING A CALL FORWARD INDICATOR

BACKGROUND

Caller ID (identification) and call forwarding are two telephone services offered to telecommunication customers. Caller ID is a telephone service that transmits a caller's number to the called party's telephone equipment during the ringing signal to enable displaying of the calling party's telephone number on a display of the called party's telephone equipment and/or on a separate caller ID device. In some situations, caller ID can also provide a name associated with the calling telephone number. Call forwarding is a feature on some telephone networks that allows an incoming call to a called party, which would be otherwise unavailable, to be redirected to a mobile telephone or other telephone number where the desired called party is situated. When a called party, that subscribes to both caller ID and call forwarding services, receives a forwarded call, the called party receives the identification of the calling party, but does not know whether the call is a forwarded call or whether the call is a direct call to the forwarded communication device. A similar situation occurs when a call is routed to multiple communication devices simultaneously and/or sequentially, e.g., an incoming call is routed to both a cell phone and an office phone simultaneously or one after the other.

SUMMARY

Embodiments of the disclosed invention include a system and a method for providing a call forward indicator to enable a called party to identify a forwarded call. In one embodiment, the method includes receiving calling information for placing a telephone call. The method determines from the calling information whether the telephone call is a forwarded call. The method modifies a caller identification of a calling party associated with the telephone call to include a call forward indicator in response to determining that the telephone call is a forwarded call. The method transmits the caller identification having the call forward indicator to a forwarded communication device associated with the called patty.

BRIEF DESCRIPTION OF THE DRAWINGS

For a more complete understanding of the present application, the objects and advantages thereof, reference is now made to the following descriptions taken in conjunction with the accompanying drawings, in which:

FIG. 2 depicts an embodiment of a process for flagging a forwarded call in accordance with the illustrative embodiments;

FIG. 3 depicts an embodiment of a process for modifying the caller ID information to include a forwarded call indicator in accordance with the illustrative embodiments.

DETAILED DESCRIPTION OF THE DRAWINGS

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
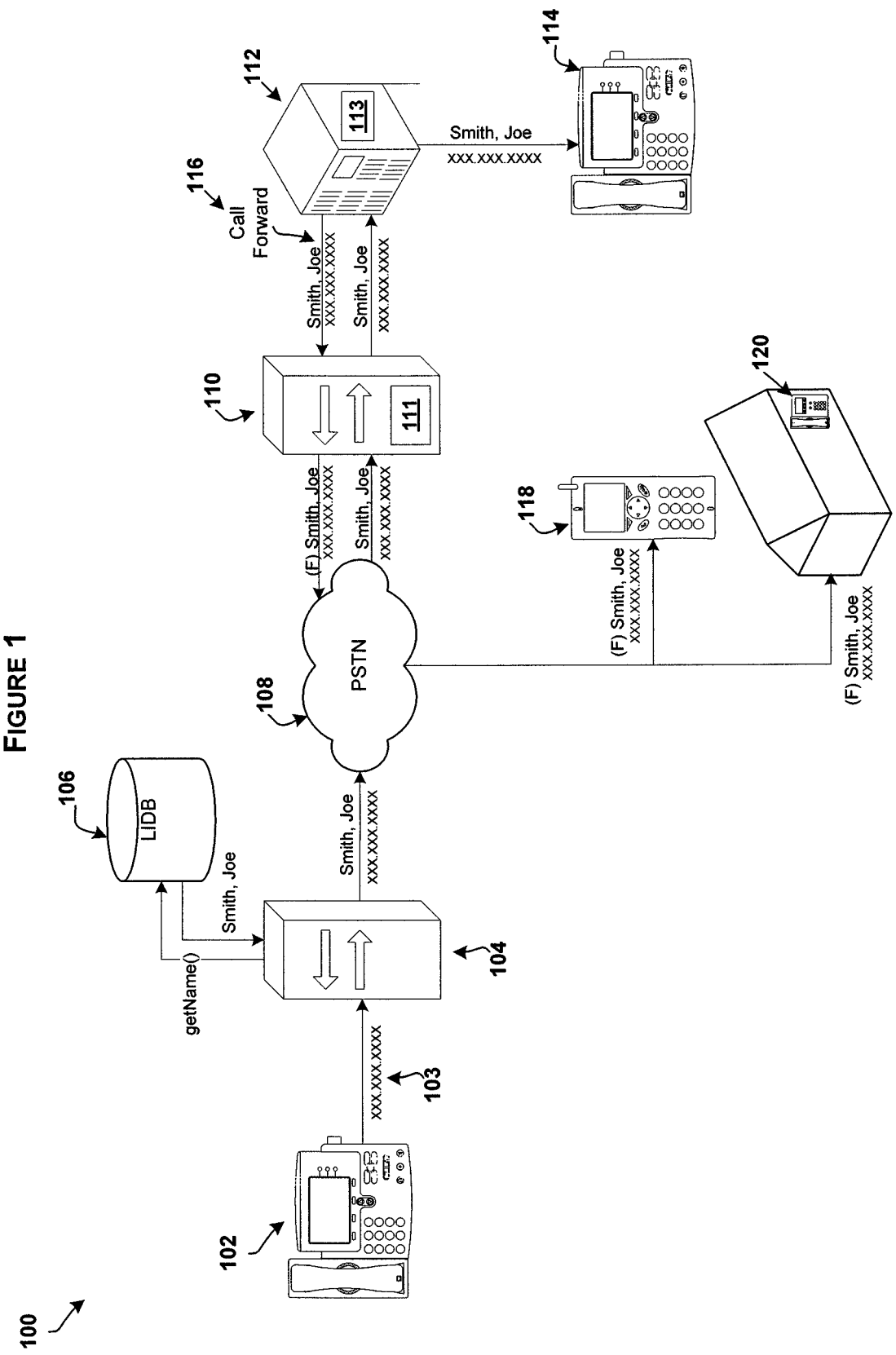
FIG. 1 depicts an embodiment of a network environment in which the illustrative embodiments may be implemented.

FIG. 1 depicts a network environment 100 in which the illustrative embodiments may be implemented for providing a call forward indicator to enable a called party to identify a forwarded call. In the depicted embodiment, communication device 102 places a call to communication device 114. Communication device 102 may be any type of communication device including, but not limited to, a landline telephone, a wireless mobile phone, and/or a voice over IP phone. In the depicted embodiment, communication device 114 is located in an office environment.

In placing a call to communication device 114, communication device 102 transmits, among other things, a phone number 103 associated with communication device 102 to a telephone switch 104. Telephone switch 104 is a system of electronic components that connects telephone calls. Telephone switch 104 is located at a central office and/or mobile switching station. For example, in one embodiment, telephone switch 104 is a class 5 switch. Class 5 switch services include basic dial-tone, calling features, and additional digital and data services.

In one embodiment, telephone switch 104 communicates with a line information database 106 to retrieve caller ID information, such as, but not limited to, a subscriber name associated with the calling party. In some embodiments, telephone switch 104 uses SS7 signaling protocol to query line information database 106 for the caller ID information and passes the calling party's name and number through the public switched telephone network (PSTN) 108 to the local central office/mobile switching center housing telephone switch 110. Telephone switch 110 routes the call to a private branch exchange (PBX) 112 associated with communication device 114.

Private branch exchange 112 is a telephone exchange/switch that serves a particular business or office, as opposed to one that a common carrier or telephone company operates for the general public. For example, in one embodiment, private branch exchange 112 is used to make connections among the internal telephones of a private organization and/or business. In some embodiments, private branch exchange 112 includes such calling features as, but not limited to, call forwarding and/or simultaneous routing of calls to multiple communication devices. For example, in one embodiment, in response to receiving an incoming call for communication device 114, private branch exchange 112 determines the call forwarding rules associated with communication device 114. For instance, in some embodiments, private branch exchange 112 may route the call including the caller ID information to communication device 114 and forward the call according to a forwarding rule if the call goes to voicemail. In another embodiment, private branch exchange 112 may automatically forward the call in accordance with the forwarding rule associated with communication device 114 to one or more communication devices.

In accordance with one embodiment, private branch exchange 112 is configured with computer executable instructions 113 to flag/indicate in some manner that an outbound call is a forwarded call. For example, in one embodiment, private branch exchange 112 may include a bit and/or variable in the calling data associated with a placed call that is recognizable by telephone switch 110 to indicate that a placed call is a forwarded call. In some embodiments, private branch exchange 112 routes the calling information 116 including the calling party's name and number to telephone switch 110. Alternatively, in some environments, if the calling party's name is not routed to telephone switch 110, telephone switch 110 may communicate with line information database 106 to retrieve the calling party's information.

Additionally, in accordance with one embodiment, telephone switch 110 is configured with electronic components, logic, and/or computer executable program instructions 111 to recognize a placed call as a forwarded call and to modify/append the caller ID information with a call forward indicator. For example, in one embodiment, telephone switch 110 may append an "(F)" to the beginning of the calling party's name to indicate that the call was forwarded from another communication device. Telephone switch 110 routes the call including the modified caller ID information through public switched telephone network 108 to the forwarded communication devices 118 and/or 120. Of course, in some embodiments, the call may also be a routed through a cellular network, the Internet, and/or other data or voice networks.

FIG. 2 depicts an embodiment of a process 200 for flagging a forwarded call in accordance with the illustrative embodiments. In one embodiment, process 200 may be performed by a private branch exchange, such as, private branch exchange 112. Process 200 begins by receiving an incoming call for a particular communication device at step 202. In one embodiment, the call data includes caller ID information of the calling party. The process, at step 204, checks the call forwarding rules associated with the called communication device. At step 206, process determines whether the call should be forwarded. If the process determines that the call is not forwarded, the process rings the called communication device at step 208 and transmits the caller ID information to the called communication device at step 210, with process 200 terminating thereafter.

However, if at step 206, the process determines that the call is to be forwarded, the process flags the calling data to indicate that the call is a forwarded call at step 212. The process forwards the calling data to the central office associated with the called communication device to route the call to the forwarded communication devices, with process 200 terminating thereafter.

FIG. 3 depicts an embodiment of a process 300 for modifying the caller ID information to include a forward call indicator in accordance with the illustrative embodiments. In one embodiment, process 300 may be performed by a class 5 telephone switch, such as, but not limited to, telephone switch 110 as depicted in FIG. 1. Process 300 begins by receiving an incoming call that includes caller ID information associated with the calling party at step 302. The process determines, at step 304, whether the calling data indicates that the placed call is a forwarded call. If the process determines that the placed call is a direct call, i.e., not a forwarded call, the process routes the call to the destination device with the caller ID information at step 308.

However, if the process determines that the call is a forwarded call at step 304, the process modifies the caller ID information with a call forward indicator at step 306. The process then routes the call to the forwarded destination device(s) with the caller ID information at step 308. The process rings the called party at step 310 and transmits the caller ID information to the communication device at step 312, with process 300 terminating thereafter.

Figure 4:
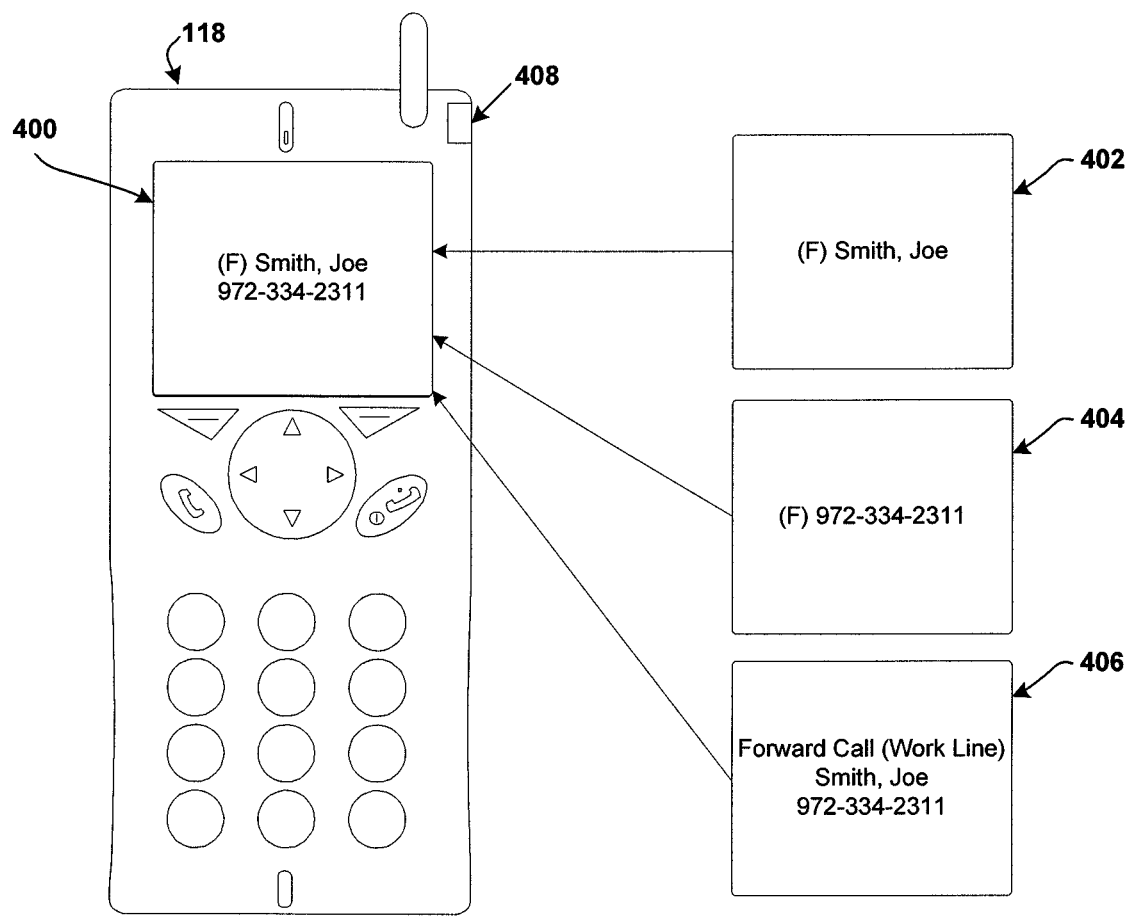
FIG. 4 depicts several embodiments of a modified caller ID containing a call forward indicator.

FIG. 4 depicts several embodiments of a modified caller ID containing a forwarded call indicator. For example, FIG. 4 illustrates communication device 118 containing modified caller ID screen 400. Modified caller ID screen 400 depicts a "(F)" at the beginning of the calling party's name and also depicts the calling party's phone number. Other embodiments include, but are not limited to, modified caller ID screen 402, 404, and 406. For instance, in some embodiments, the forward indicator may be at the beginning of the calling party's phone number, as depicted in modified caller ID screen 404. In other embodiments, the forward indicator may indicate the forwarding communication device/line, such as indicated in modified caller ID screen 406. Alternatively, in some embodiments, a user may specify any character string as a forward indicator. For example, in some embodiments, the user may specify the forward indicator in conjunction with configuring forwarding rules associated with the communication device via a telephonic setup and/or via a web portal. Further, in some embodiments, the forward indicator may be something other than a character string. For example, in some embodiments, an instruction bit/signal may be appended to the caller ID information to cause a communication device to illuminate a light indicator 408 or to ring communication device 118 differently to indicate a forwarded call.

Accordingly, embodiments of the disclosed invention include a system and a method for providing a call forward indicator to enable a called party to identify a forwarded call. In one embodiment, a method is presented that includes receiving calling information for placing a telephone call. The method determines from the calling information whether the telephone call is a forwarded call. The method modifies a caller identification of a calling party associated with the telephone call to include a call forward indicator in response to determining that the telephone call is a forwarded call. The method transmits the caller identification having the call forward indicator to a forwarded communication device associated with the called party.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A method for providing a call forward indicator to enable a called party to identify a forwarded call, the method comprising:
   receiving calling information for placing a telephone call;
   determining from the calling information whether the telephone call is a forwarded call;
   responsive to a determination that the telephone call is a forwarded call,
   appending a call forward indicator comprising a character string of one or more characters to a caller identification comprising at least one of a calling party's name and telephone number such that the call forward indicator and the caller identification comprising at least one of the calling party's name and telephone number can be displayed together on a display associated with a forwarded communication device, wherein the call forward indicator indicates that the call is a forwarded call and wherein the call forward indicator is specified by a user in conjunction with configuring a forwarding rule;
   transmitting the caller identification having the call forward indicator appended thereto to the forwarded communication device associated with the called party;
   displaying the call forward indicator and the caller identification comprising at least one of the calling party's name and telephone number on the display associated with the forwarded communication device; and
   causing a light to illuminate on the forwarded communication device.

2. The method of claim 1, wherein the forwarded call is a call routed simultaneously to two or more communication devices.

3. The method of claim 1, wherein the forwarded call is a call routed from a first communication device to the forwarded communication device.

4. The method of claim 1, wherein the calling information is modified by a private branch exchange to indicate a forwarded call.

5. The method of claim 1, wherein the caller identification is modified by a telephone switch to include the call forward indicator.

6. The method of claim 1, wherein the call forward indicator indicates a first communication device from which the call is being forwarded.

7. A telephone switch comprising electronic components and logic configured to:
   receive calling information for placing a telephone call;
   determine from the calling information whether the telephone call is a forwarded call;
   append a call forward indicator comprising a character string of one or more characters to a caller identification comprising at least one of a calling party's name and telephone number in response to a determination that the telephone call is a forwarded call, such that the call forward indicator and the caller identification comprising at least one of the calling party's name and telephone number can be displayed on a display associated with a forwarded communication device, wherein the call forward indicator indicates that the call is a forwarded call, and further wherein the call forward indicator is specified by a user in conjunction with configuring a forwarding rule;

transmit the caller identification having the call forward indicator appended thereto to the forwarded communication device associated with the called party;

display the call forward indicator and the caller identification comprising at least one of the calling party's name and telephone number on a display associated with the forwarded communication device; and cause a light to illuminate on the forwarded communication device.

8. The telephone switch of claim 7, wherein the forwarded call is a call routed simultaneously to two or more communication devices.

9. The telephone switch of claim 7, wherein the forwarded call is a call routed from a first communication device to the forwarded communication device.

10. The telephone switch of claim 7, wherein the calling information is modified by a private branch exchange to indicate a forwarded call.

11. The telephone switch of claim 7, wherein the call forward indicator indicates a first communication device from which the call is being forwarded.

12. A non-transitory computer program product comprising computer executable program code to:

receive calling information for placing a telephone call;

determine from the calling information whether the telephone call is a forwarded call;

append a call forward indicator to a caller identification comprising at least one of a calling party's name and telephone number in response to a determination that the telephone call is a forwarded call, such that the call forward indicator and the caller identification comprising at least one of the calling party's name and telephone number can be displayed on a display associated with a forwarded communication device, and wherein the call forward indicator indicates that the call is a forwarded call and wherein the call forward indicator is specified by a user in conjunction with configuring a forwarding rule;

transmit the caller identification having the call forward indicator appended thereto to the forwarded communication device associated with the called party;

display the call forward indicator and the caller identification comprising at least one of the calling party's name and telephone number on a display associated with the forwarded communication device; and cause a light to illuminate on the forwarded communication device.

* * * * *